United States Patent
Hontheim et al.

(10) Patent No.: US 8,393,889 B2
(45) Date of Patent: Mar. 12, 2013

(54) HOT-RUNNER SYSTEM HAVING VALVE STEM MOVABLE RESPONSIVE TO ELECTRO-MAGNETIC ACTUATOR

(75) Inventors: Daniel Hontheim, Bettingen (DE); Ruud Maria Theodorus Luijs, Luxembourg Ville (LU)

(73) Assignee: Husky Injection Molding Systems Ltd, Bolton, Ontario (CA)

(*) Notice: Subject to any disclaimer, the term of this patent is extended or adjusted under 35 U.S.C. 154(b) by 33 days.

(21) Appl. No.: 13/147,609

(22) PCT Filed: Apr. 19, 2010

(86) PCT No.: PCT/CA2010/000544
§ 371 (c)(1),
(2), (4) Date: Aug. 3, 2011

(87) PCT Pub. No.: WO2010/121350
PCT Pub. Date: Oct. 28, 2010

(65) Prior Publication Data
US 2011/0293761 A1    Dec. 1, 2011

Related U.S. Application Data

(60) Provisional application No. 61/171,157, filed on Apr. 21, 2009.

(51) Int. Cl.
*B29C 45/23* (2006.01)

(52) U.S. Cl. .............. 425/564; 264/328.9; 425/566

(58) Field of Classification Search .......... 425/562, 425/563, 564, 565, 566; 264/328.9
See application file for complete search history.

(56) References Cited

U.S. PATENT DOCUMENTS

| | | | |
|---|---|---|---|
| 5,078,589 A | 1/1992 | Osuna-Diaz | |
| 5,364,252 A | 11/1994 | Hlavaty et al. | |
| 5,894,023 A | 4/1999 | Schramm et al. | |
| 7,722,351 B2 * | 5/2010 | Feick et al. | 425/564 |
| 2005/0100625 A1 | 5/2005 | Tooman et al. | |
| 2006/0222731 A1 | 10/2006 | Paris et al. | |
| 2008/0290972 A1 | 11/2008 | Jotter et al. | |

OTHER PUBLICATIONS

Ewikon, Hotrunner Systems of America, Inc. Electrical needle drive unit for valve gate systems, (Model No. HPS III-NVE1 and HPS III-NVE2) May, 2005, Ewikon Heibkanalsysteme GmbH & Co. Kg, Frankenberg and East Dundee, IL U.S.A.

* cited by examiner

*Primary Examiner* — Tim Heitbrink

(57) ABSTRACT

Disclosed is a hot-runner system (101), including: an actuation plate (202) being movable; a valve stem (205) installed in the actuation plate (202), the valve stem (205) being movable responsive to movement of the actuation plate (202); and an electro-magnetic actuator (210) being coupled with the actuation plate (202), the electro-magnetic actuator (210) being configured to actuatably move the actuation plate (202).

6 Claims, 3 Drawing Sheets

HOT-RUNNER SYSTEM HAVING VALVE STEM MOVABLE RESPONSIVE TO ELECTRO-MAGNETIC ACTUATOR

TECHNICAL FIELD

Embodiments of the present invention generally relate to a hot-runner system having a valve stem installed in an actuation plate that is movable responsive to actuation of an electro-magnetic actuator.

BACKGROUND OF THE INVENTION

U.S. Pat. No. 5,078,589 to OSUNA-DIAZ, issued on 7 Jan. 1992, discloses an arrangement for independently controlling shutoff and flow to a cavity gate in a multicavity injection mold apparatus, in which a plurality of valve pins are mounted to a movable holder plate, each aligned with a cavity gate and movable thereinto to control shutoff and a plurality of fixed position plunger sleeves are each mounted over a respective valve pin and adjustably positioned with respect to a restriction feature in the supply passage upstream of the associated gate.

U.S. Pat. No. 5,364,252 to HLAVATY et al., published on 15 Nov. 1994, discloses a gas injector having a retractable nozzle with linear gas feed passage therethrough for a gas-assist plastics injection molding machine. An injector interfaces with an injection molding tool and has a nozzle with a tip that, in a forward position, protrudes through a port leading into a tool cavity or a runner system leading into the cavity for gas injection during molding. The nozzle tip is connected by a nozzle body to a base that is operatively mounted in an actuator housing. The base is connected to an in-line gas routing extension of the nozzle that projects through the outer cover of the housing. The extension is coaxial with an internal spring that seats on the base and holds the nozzle tip in a gas injection position resisting the force of plastics injection pressure. The base connected nozzle is retracted by combined flux fields of an electromagnet and a permanent magnet mounted within the housing while compressively loading the spring enhancing gas release.

U.S. Pat. No. 5,894,023 to SCHRAMM et al., issued on 13 Apr. 1999, discloses an apparatus of injection molding three-layer moldings, especially bottle blanks with an inner and an outer layer of polyethylene terephthalate and a middle layer of recycled polyethylene terephthalate, employing a mold with several cavities. The material (component A) for the inner and outer layers is supplied through one molten-component conveying channel and the material (component B) for the middle layer through another molten-component conveying channel. The channels are separately heated and their temperatures independently regulated. The melt for component A flows the same distance as the melt for component B. The melts flow into the injection-molding dies such as to ensure a uniform front.

United States Patent Application Number 2006/0222731 to PARIS et al., published on 2006-10-05 discloses a molten molding material dispenser useful in a molding machine. The dispenser has an outlet body defining an outlet, and also has an outlet cover that is movable relative to the outlet. The outlet body and the outlet cover can be magnetically movable and are mechanical-actuation disengaged.

Non-patent literature published May 2005 by EWIKON Hotrunner Systems of America, Inc. (East Dundee, Ill.) USA discloses an electric needle drive unit (Model Number HPS III-NVE1 and HPS III-NVE2) for valve-gated hot-runner systems that are used in molding systems.

Examples of known molding systems are (amongst others): (i) the HyPET (TRADEMARK) Molding System, (ii) the Quadloc (TRADEMARK) Molding System, (iii) the Hylectric (TRADEMARK) Molding System, and (iv) the HyMet (TRADEMARK) Molding System, all manufactured by Husky Injection Molding Systems Limited (Location: Bolton, Ontario, Canada; www.husky.ca).

SUMMARY OF THE INVENTION

The invention is set forth and characterized in the main claim(s), while the dependent claims describe other characteristics of the invention.

The inventors have arrived at an understanding of the difficulty associated with the state of the art, which may not be generally known to those persons skilled in the art. The inventors believe that at the end of valve stem closing and in closed position of the valve stem (during part cooling) the highest force is required to maintain the valve stem closed. For known linear electro-magnetic actuators that are coupled with the valve stem, this arrangement may require energizing of the known actuator by using a high current, which leads to a disadvantageous overheating of the coils of the actuator, thus reducing the life of these known actuators. To ensure a suitably long lifetime of the known actuators, they typically have a limitation in switch-on time of the coils; however, for certain applications (such as, ratio valve stem close time and/or overall cycle time, etc) it will be very difficult to respect this limitation imposed on the current without increasing the cycle time (that is, keeping cycle time down is very important for reducing overall manufacturing costs). In addition, the inventors believe that hydraulic-actuation and/or pneumatic-actuation mechanisms experience friction in the seals, and this arrangement disadvantageously leads to actuation delays and loss of effective gate closing force.

The present invention provides a hot-runner system that may be used in clean-room applications (that is, medical molding) that do not allow usage of oil-actuated hot runner systems. Electromagnetic actuation in the hot-runner system allows medical manufacturers to operate the molding system in a clean room environment without possible (inadvertent) contamination due to hydraulic oil associated with known hydraulically actuated hot-runner system. Another advantage is provision of a hot-runner system for use in fully electric molding systems without the use of optional hydraulic auxiliary equipment. As well, another possible advantage is the reduction of mold shut heights.

Therefore, in accordance with a general aspect of the present invention, there is provided a hot-runner system, including: an actuation plate being movable; a valve stem installed in the actuation plate, the valve stem being movable responsive to movement of the actuation plate; and an electro-magnetic actuator being coupled with the actuation plate, the electro-magnetic actuator being configured to actuatably move the actuation plate.

The inventors believe that for the non-limiting embodiments of the present invention, when the valve stem is closed, the distance between an electromagnet and a permanent magnet (that is, components used in the electro-magnetic actuator) is very small, which provides the advantage of the possibility of achieving a relatively high closing force (acting on the valve stem) by using a low current to energize the electromagnet, so that there is a substantially lower risk for over overheating the coils of the electromagnet and thus prolonging the life of the electro-magnetic actuator.

These and other aspects and features of non-limiting embodiments of the present invention will now become apparent to those skilled in the art upon review of the following description of specific non-limiting embodiments of the invention in conjunction with the accompanying drawings.

DETAILED DESCRIPTION OF THE DRAWINGS

The invention and its embodiments will be more fully appreciated by reference to the following detailed description of illustrative (non-limiting) embodiments in accordance with the present invention when taken in conjunction with the accompanying drawings, in which.

Figure 1:
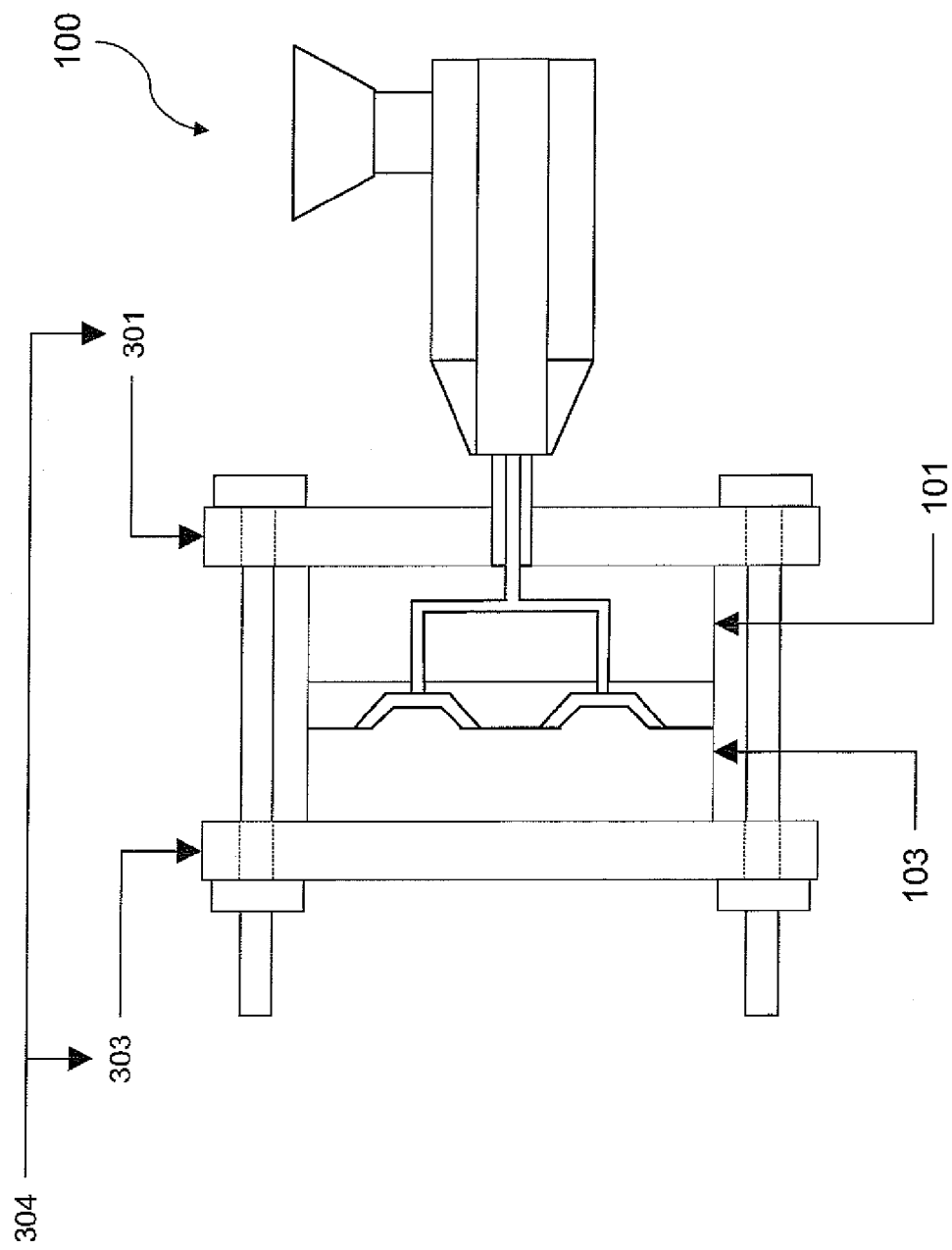
FIG. 1 depicts a schematic representation of a molding system 100 having a hot-runner system 101 according to a first non-limiting embodiment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

The following is a listing of the reference numerals used in the Detailed Description:

| | |
|---|---|
| molding system 100 | hot-runner system 101 |
| mold assembly 103 | nozzle stack assembly 110 |
| first stationary plate 201 | actuation plate 202 |
| second stationary plate 203 | first magnetic assembly 204 |
| valve stems 205 | second magnetic assembly 206 |
| electro-magnetic actuator 210 | stem coupler 211 |
| electromagnets 214 | permanent magnets 216 |
| stationary platen 301 | movable platen 303 |
| platen assembly 304 | valve stem assembly 305 |

DETAILED DESCRIPTION OF THE PREFERRED EMBODIMENT(S)

Reference will now be made in detail to the non-limiting embodiment(s) of the present invention.

FIG. 1 depicts the schematic representation of the molding system 100 having the hot-runner system 101. The hot-runner system 101 is configured to cooperate with (that is, to distribute melt to) the mold assembly 103 that is supported by the molding system 100. The molding system 100 includes a platen assembly 304 having: (i) a stationary platen 301, and (ii) a movable platen 303 that is movable relative to the stationary platen 301. The platen assembly 304 is configured to support the hot-runner system 101. The platen assembly 304 is configured to support the mold assembly 103. The mold assembly 103 is to be connected with the hot-runner system 101. It will be appreciated that the molding system 100, the hot-runner system 101 and the mold assembly 103 may all be sold separately or provided by a single vendor in combination. It will also be appreciated that the molding system 100, the hot-runner system 101 and the mold assembly 103 may include components that are known to persons skilled in the art, and these known components will not be described here; these known components are described, at least in part, in the following reference books, for example: (i) "*Injection Molding Handbook*" authored by OSSWALD/ TURNG/GRAMANN (ISBN: 3-446-21669-2), (ii) "*Injection Molding Handbook*" authored by ROSATO AND ROSATO (ISBN: 0-412-99381-3), (iii) "*Injection Molding Machines*" 3rd Edition authored by JOHANNABER (ISBN 3-446-17733-7) and/or (iv) "*Runner and Gating Design Handbook*" authored by BEAUMONT (ISBN 1-446-22672-9).

Figure 2:
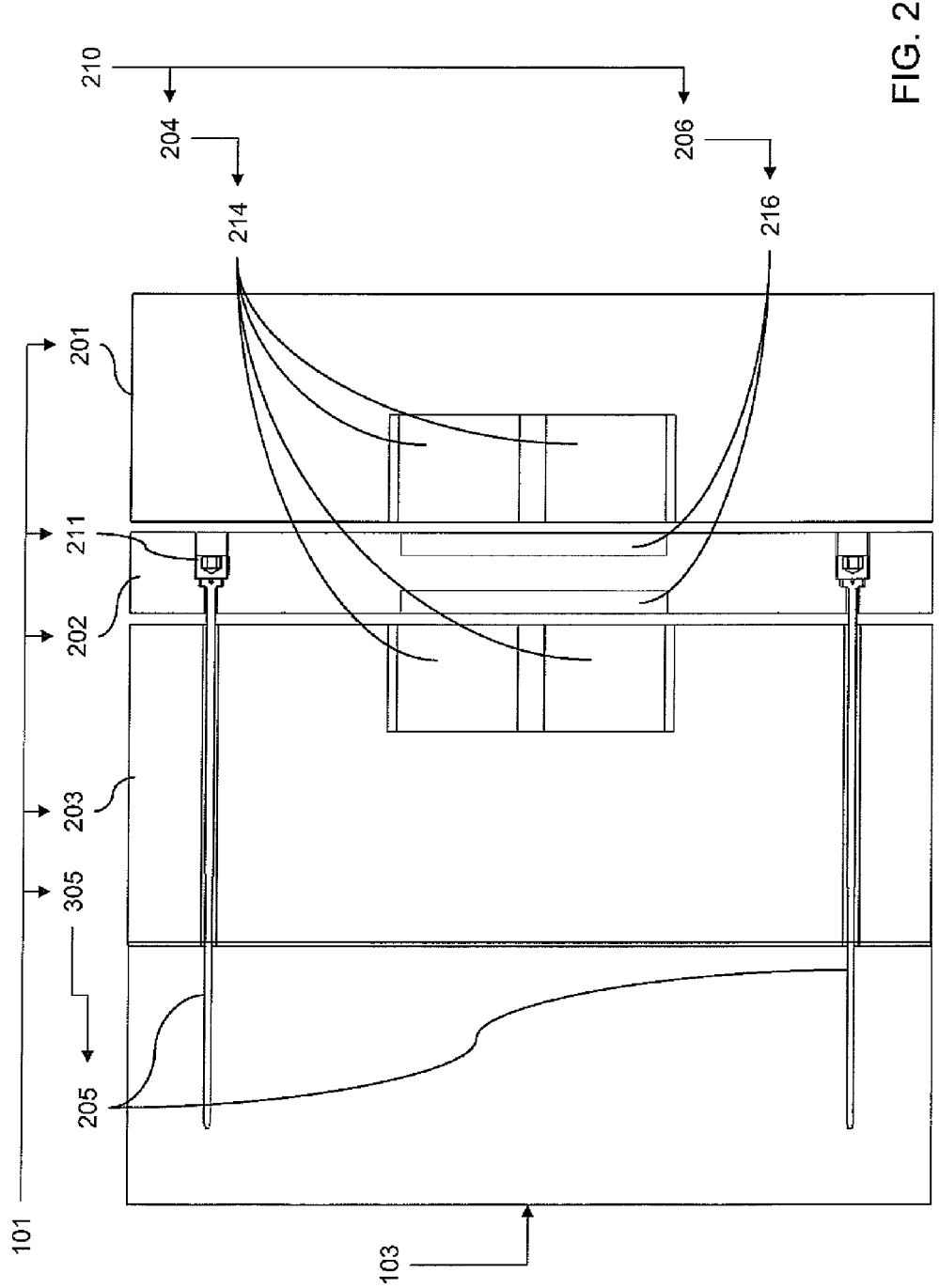
FIG. 2 depicts a schematic representation of the hot-runner system 101 of FIG. 1.

FIG. 2 depicts the schematic representation of the hot-runner system 101 of FIG. 1. The hot-runner system 101 includes: (i) an actuation plate 202, (ii) a valve stem assembly 305, and (iii) an electro-magnetic actuator 210. The actuation plate 202 is movable. The valve stem assembly 305 is installed in (connected to or coupled with) the actuation plate 202. The valve stem assembly 305 is movable responsive to movement of the actuation plate 202. The electro-magnetic actuator 210 is coupled, at least in part, with the actuation plate 202. The electro-magnetic actuator 210 is configured to actuatably move the actuation plate 202. More specifically, the hot-runner system 101 also includes: (i) a first stationary plate 201, and (ii) a second stationary plate 203 that is offset from the first stationary plate 201. The second stationary plate 203 is configured to couple with the mold assembly 103. The actuation plate 202 is located between (and is movable between) the first stationary plate 201 and the second stationary plate 203. More specifically, the valve stem assembly 305 includes valve stems 205 installed in the actuation plate 202. The valve stems 205 extend through the second stationary plate 203. The valve stems 205 are movable between an opened position and a closed position responsive to movement of the actuation plate 202. A stem coupler 211 is used to couple each of the valve stems 205 with the actuation plate 202. It will be appreciated that the stem coupler 211 may be used to: (option i) permanently couple each of the valve stems 205 with the actuation plate 202, or (option ii) temporarily couple each of the valve stems 205 with the actuation plate 202, or (option iii) a combination of (option i) and (option ii). More specifically, for (option ii), the stem coupler 211 includes a shear pin (for example) that breaks apart, much like a mechanical fuse, in response to an amount of an unwanted force acting on the shear pin, and the arrangement in accordance with (option ii) permits the valve stems 205 to become advantageously decoupled from the actuation plate 202 without inadvertently breaking or bending the valve stems 205. The valve stems 205 extend through the second stationary plate 203 by way of passages extending through the second stationary plate 203. The valve stems 205 are configured to permit filling of the mold assembly 103 with the melt prepared by an extruder of the molding system 100. In the opened position, the valve stems 205 are placed such that the melt may flow into the mold cavity (or mold cavities) of the mold assembly 103. In the closed position, the valve stems 205 do not permit (or block) flow of the melt into the mold assembly 103. The electro-magnetic actuator 210 is coupled with: (i) the first stationary plate 201, (ii) the second stationary plate 203, and (iii) the actuation plate 202. The electro-magnetic actuator 210 is configured to move the actuation plate 202 relative to (that is between) the first stationary plate 201 and the second stationary plate 203. More specifically, the electro-magnetic actuator 210 includes: (i) a first magnetic assembly 204, and (ii) a second magnetic assembly 206. The second magnetic assembly 206 is supported by the actuation plate 202. According to a variation, the first magnetic assembly 204 of the electro-magnetic actuator 210 is coupled, at least in part, with the actuation plate 202. According to another variation, the first magnetic assembly 204 is supported by the first stationary plate 201 and the second stationary plate 203. The actuation plate 202 is movable in response to an interaction of magnetic fields between (or associated with) the first magnetic assembly 204 and the second magnetic assembly 206. More specifically, the first magnetic assembly 204 includes electromagnets 214 supported by the first stationary plate 201 and the second stationary plate 203. The first stationary plate 201 and the second stationary plate 203 define recesses that securely and supportively receive the electromagnets 214. An electromagnet is a type of magnet in which the magnetic field is produced by the flow of an electric current. The electromagnet includes a temporary magnet made by coiling wire around an iron core so that when current flows in the coil the iron core becomes a magnet. More specifically, the second magnetic assembly 206 includes permanent magnets 216 supported by the actuation plate 202. A permanent magnet is a magnet that retains its magnetism after being removed from a magnetic field; the permanent magnet is one made from a material that stays magnetized. The actuation plate 202 defines recesses that supportively and securely receive the permanent magnets 216. The permanent magnets 216 are installed such that either south poles or north poles of the permanent magnets 216 are oriented towards the electromagnets 214. For the electromagnet 214, it is possible to switch north pole and south pole by applying a current to the electromagnet 214, which creates: (i) a push (that is, de-actuation) force for the case where two north poles are oriented to each other, so that the valve stems 205 may be actuated to move so as to block or prevent the flow of melt into the mold cavity of the mold assembly 103, or (ii) an energizing (that is, actuation) force for the case where south pole and north pole are oriented towards each other, so that the valve stems 205 may be actuated to move so as to permit the flow of melt into the mold cavity of the mold assembly 103. Due to the interaction of the magnetic fields, the actuation plate 202 is able to move back and forth so as to permit the valve stems 205 to move between: (i) the opened position (where the melt flows into the mold assembly 103), and (ii) the closed position (where melt is prevented from flowing into the mold assembly 103).

Figure 3:
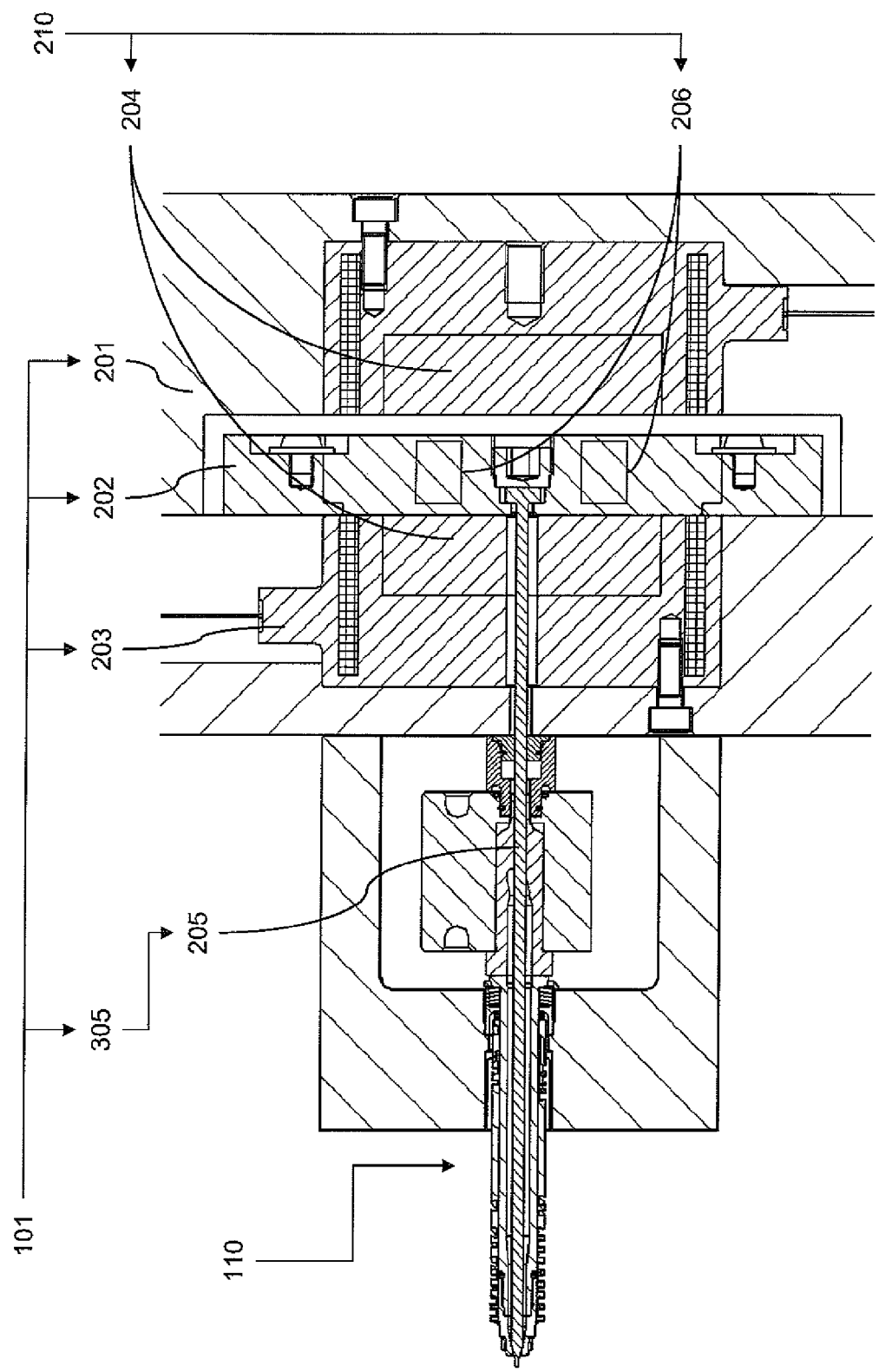
FIG. 3 depicts another schematic representation of the hot-runner system 101 of FIG. 1 according to a second non-limiting embodiment.

FIG. 3 depicts another schematic representation of the hot-runner system 101 of FIG. 1, in which a single valve stem 205 is moved when the actuation plate 202 is made to be moved by the electro-magnetic actuator 210. A nozzle stack assembly 110 receives the valve stem 205.

It is noted that the foregoing has outlined some of the more pertinent non-limiting embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed non-limiting embodiments can be effected without departing from the spirit and scope of the invention. The described non-limiting embodiments ought to be construed to be merely illustrative of some of the more prominent features and applications of the invention. Other beneficial results can be realized by applying the disclosed invention in a different manner or modifying the invention in ways known to those familiar with the art. This includes the mixing and matching of features, elements and/or functions between various non-limiting embodiments is expressly contemplated herein, unless described otherwise, above.

What is claimed is:
1. A hot-runner system (101), comprising:
an actuation plate (202) being movable;
a valve stem assembly (305) installed in the actuation plate (202), the valve stem assembly (305) being movable responsive to movement of the actuation plate (202);
an electro-magnetic actuator (210) being coupled, at least in part, with the actuation plate (202), the electro-magnetic actuator (210) being configured to actuatably move the actuation plate (202);
a first stationary plate (201); and
a second stationary plate (203) being offset from the first stationary plate (201);
wherein:
the actuation plate (202) is located and being movable between the first stationary plate (201) and the second stationary plate (203);
the valve stem assembly (305) includes valve stems (205) installed in the actuation plate (202), the valve stems (205) extending through the second stationary plate (203), the valve stems (205) being movable between an opened position and a closed position responsive to movement of the actuation plate (202); and
the electro-magnetic actuator (210) is coupled with:
(i) the first stationary plate (201), (ii) the second stationary plate (203), and (iii) the actuation plate (202), the electro-magnetic actuator (210) being configured to move the actuation plate (202) relative to the first stationary plate (201) and the second stationary plate (203).

2. The hot-runner system (101) of claim 1, wherein:
the electro-magnetic actuator (210) includes:
a first magnetic assembly (204) being supported by the first stationary plate (201) and the second stationary plate (203); and
a second magnetic assembly (206) being supported by the actuation plate (202), the actuation plate (202) is movable responsive to interaction of magnetic fields associated with the first magnetic assembly (204) and the second magnetic assembly (206).

3. The hot-runner system (101) of claim 2, wherein:
the first magnetic assembly (204) includes:
electromagnets (214) being supported by the first stationary plate (201) and the second stationary plate (203); and
the second magnetic assembly (206) includes:
permanent magnets (216) being supported by the actuation plate (202).

4. The hot-runner system (101) of claim 3, further comprising:
a stem coupler (211) coupling, at least in part, the valve stems (205) with the actuation plate (202), the stem coupler (211) temporarily coupling the valve stems (205) with the actuation plate (202), the stem coupler (211) including a shear pin that breaks apart in response to an unwanted force acting on the shear pin, so that the valve stems (205) is permitted to become decoupled from the actuation plate (202) without inadvertently breaking or bending the valve stems (205).

5. A molding system (100), comprising:
a platen assembly (304) supporting the hot-runner system (101) of any one of claim 1.

6. A molding system (100), comprising:
a platen assembly (304) supporting a mold assembly (103) and also supporting the hot-runner system (101) of any one of claim 1, the mold assembly (103) being connected with the hot-runner system (101).

* * * * *